Sept. 1, 1931. S. H. BEETEM 1,821,288
BAIT BOTTLE
Filed Nov. 13, 1928

INVENTOR.
Samuel H. Beetem.
BY
Townsend, Loftus & Abbett
ATTORNEYS.

Patented Sept. 1, 1931

1,821,288

UNITED STATES PATENT OFFICE

SAMUEL H. BEETEM, OF BENICIA, CALIFORNIA, ASSIGNOR TO REX RESEARCH CORPORATION, OF TOLEDO, OHIO, A CORPORATION OF DELAWARE

BAIT BOTTLE

Application filed November 13, 1928. Serial No. 319,117.

This invention relates to a bait bottle, and especially to a bottle which is adapted to contain a poison bait for the destruction of insects, such as ants, etc.

The object of the present invention is to generally improve the construction and operation of bait bottles of the character described; to provide a bottle which will assume a vertical position wherever it is to be placed and which will be provided with a cover to prevent animals and small children from getting at the poison content, but at the same time permit free access to ants etc.; to provide a cover which will prevent entrance of water from rain or when sprinkling the garden, and further to provide a cover and support therefor which may be readily removed when the bottle is to be cleaned or refilled.

Figure 1:
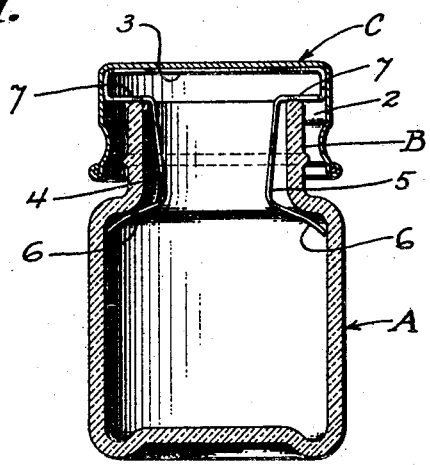
Figure 2:
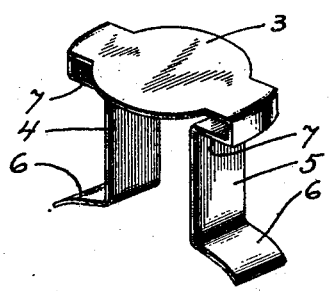

The bait bottle is shown by way of llustration in the accompanying drawings, in which, Fig. 1 is a central vertical section of the bait bottle, said section also showing the cover and the cover support, Fig. 2 is a perspective view of the cover support.

Referring to the drawings in detail, particularly to Fig. 1, A indicates a bottle, or like container, which is provided with a neck portion B. Insertable in the neck portion, and adapted to be retained therein, is a cover support, such as shown in Fig. 2, and supported by said support is a cover, generally indicated at C. This cover is held in an elevated position with relation to the upper end of the neck B, and as the cover is of a larger diameter than the neck, an annular surrounding passage 2 is formed, through which ants or like insects may freely enter and leave. The cover support shown in Fig. 2 consists of a head portion 3, which is provided with two downwardly extending legs, such as indicated at 4 and 5. The lower ends of the legs are bent outwardly, as indicated at 6, to engage the under side of the annular shoulder formed between the neck and the body of the bottle, and the upper ends of the legs are shouldered, as shown at 7 so as to support them with relation to the neck of the bottle, and also to elevate the cover C with relation to the upper end of the neck.

In actual operation, when it is desired to fill the bottle with poison bait it is only necessary to remove the cover and the cover support. This is readily accomplished, as the legs are made of a resilient material which permits them to be easily pulled out of the neck. When the bottle has been partially filled with bait, the legs 4 and 5 are squeezed together and inserted in the neck and then pushed downwardly until the projections 6 engage the body of the container. The cover is then placed on top of the support, as shown in Fig. 1, and the bait bottle may be placed wherever desired, whether it be inside of a house or in the garden or surrounding grounds.

The structure shown is exceedingly simple and cheap to manufacture. Practically any type of bottle may be used providing the neck portion is sufficiently large in diameter to permit insertion of the legs 4 and 5 of the cover support.

The cover and support, when in position, permit free entrance and exit of insects such as ants and the like, but as the cap extends a considerable distance downwardly below the top of the neck, it is obvious that animals such as cats and dogs will be barred from getting at the poison bait, this being also true of small children. Water is also excluded whether it be raining, or if the garden is being sprinkled and dilution of the poison bait is thus prevented.

Practically any cover may be employed, even though it is considerably larger than here shown, as its only function is that of excluding water. The head member 3 of the cap support serves the function of excluding other animals but the insects which it is intended to destroy, as the head 3 substantially covers the open end of the neck. In fact, if it were not desired to exclude water, for instance when sprinkling the garden or when it is raining, the cap or cover C might be entirely dispensed with, for instance when the bait bottle is used within a dwelling.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. A device of the character described comprising a container having a neck and being open at its upper end; a head member forming a substantial closure for the upper end of the neck, but spaced vertically therefrom to permit free entrance of ants and the like; and a pair of legs secured to the head member and extending downwardly into the neck to retain the head member against removal.

2. A device of the character described comprising a container having a neck and being open at its upper end; a pair of leg members extending into the neck of the container; a head member supported by said legs and maintained in an elevated position with relation to the upper end of the container; and a cover supported by the head member, said cover being of larger diameter than the upper open end of the container.

3. A device of the character described comprising a container having a neck and being open at its upper end, a cover member for the container, a pair of leg members on the cover extending into the neck of the container, said leg members being offset adjacent their upper ends to maintain a spacing between the cover and the upper open end of the neck of the container, and an annular down turned flange on the cover, said flange substantially enclosing the neck and the container but spaced therefrom to provide an annular unobstructed passage for the entrance of insects.

SAMUEL H. BEETEM.